(12) United States Patent
Coon

(10) Patent No.: US 6,663,750 B1
(45) Date of Patent: Dec. 16, 2003

(54) MULTI-UNIT, DISTRIBUTIVE, REGENERABLE, IN SITU DESALINATION SYSTEM, APPARATUS AND METHOD

(76) Inventor: Warren Coon, 26201 Ynez Rd., Ste. 104, Temecula, CA (US) 92591

( * ) Notice: Subject to any disclaimer, the term of this patent is extended or adjusted under 35 U.S.C. 154(b) by 169 days.

(21) Appl. No.: 09/939,544

(22) Filed: Aug. 23, 2001

Related U.S. Application Data

(60) Provisional application No. 60/227,646, filed on Aug. 24, 2000.

(51) Int. Cl.[7] .............................. B01D 3/02; C02F 1/14
(52) U.S. Cl. .................. 202/234; 202/83; 202/202; 202/266; 159/904; 159/906; 126/600; 126/657
(58) Field of Search ................ 203/10, DIG. 1, 203/DIG. 17, 100, 1, 86, 71; 159/903, 904, 906; 202/83, 234, 202, 266, 267.1; 126/600, 657, 688–700; 47/81, 48.5

(56) References Cited

U.S. PATENT DOCUMENTS

| | | | | |
|---|---|---|---|---|
| 2,530,376 A | * | 11/1950 | Castle et al. ................ | 202/187 |
| 2,807,912 A | * | 10/1957 | Bjorksten ................ | 47/58.1 R |
| 3,653,150 A | * | 4/1972 | Howard ...................... | 47/22.1 |
| 3,875,926 A | * | 4/1975 | Frank .......................... | 126/635 |
| 4,252,107 A | * | 2/1981 | Horton ........................ | 126/605 |
| 4,276,122 A | * | 6/1981 | Snyder ........................ | 202/234 |
| 4,312,709 A | * | 1/1982 | Stark et al. .................... | 202/83 |
| 4,383,891 A | * | 5/1983 | Clavier ........................ | 202/234 |
| 4,475,988 A | * | 10/1984 | Tsumura et al. ............ | 202/174 |
| 4,504,362 A | * | 3/1985 | Kruse ............................. | 203/3 |
| 4,578,898 A | * | 4/1986 | Greenbaum ..................... | 47/79 |
| 4,585,523 A | * | 4/1986 | Giddings ..................... | 202/236 |
| 4,698,135 A | * | 10/1987 | Raab .......................... | 202/234 |
| 4,959,127 A | * | 9/1990 | Michna ........................ | 202/177 |
| 5,628,879 A | * | 5/1997 | Woodruff ..................... | 202/234 |
| 5,650,050 A | * | 7/1997 | Kaufmann .................... | 202/234 |
| 6,440,275 B1 | * | 8/2002 | Domen ........................ | 202/234 |
| 6,494,995 B1 | * | 12/2002 | Battah ........................ | 202/234 |

* cited by examiner

Primary Examiner—Virginia Manoharan
(74) Attorney, Agent, or Firm—Louis J. Bachand

(57) ABSTRACT

Cultivated field water is desalinated by a series of independent units that float on the water surface, taking up the saline water with a wick, evaporating the water from the wick in desalinating relation by concentrating incident solar radiation with a combination of a lenses and cooperating mirrors onto the upper end portion of the wick while the wick lower end portion is immersed in the field water, capturing the desalinated vapor resulting by condensing within the unit and returning the condensed, desalinated water to the field, and periodically renewing the wick by rinsing the salt from it at a cleaning station beyond the field.

32 Claims, 5 Drawing Sheets

MULTI-UNIT, DISTRIBUTIVE, REGENERABLE, IN SITU DESALINATION SYSTEM, APPARATUS AND METHOD

CROSS-REFERENCE TO RELATED APPLICATIONS

This application claims the benefit of U.S. Provisional Application Serial No. 60/227,646, filed Aug. 24, 2000.

Statement Regarding Federally Sponsored Research or Development

Not Applicable

Reference to a Microfiche Appendix

Not Applicable

BACKGROUND OF THE INVENTION

1. Field of the Invention

This invention relates to amelioration of salt build-up in earth under cultivation, and more particularly to distributed apparatus and distributive methods for continual, discrete removal of salts from irrigation water. The invention provides generally small, relatively portable, salt removal devices that are not typically fixed to the ground. These salt removal devices employ a solar distillation system of increased efficiency, and concentrate salts recovered in a readily removable and regenerable vessel. The invention method collects salt-bearing water from a source such as irrigating flows over a cultivated area, solar-distills the water, captures the salt in a solar energy-radiated wick structure and returns the desalted water to the field, all with a multiplicity of quite small devices that suitably fit within and among growing crops without any adverse effect on adjacent plant life.

2. Background Art

Water for agricultural use has historically been made available at low cost, providing little incentive to conserve or efficiently use the water. Typically, as in the United States Southwest, water is applied to the cultivated land in abundance and then drained away by gravity as agricultural runoff back into rivers for use and reuse down stream. Limited amounts of water are not applied and allowed to soak in since excess accumulations of salts from the applied water will remain in the soil, making the field unusable for agricultural use for many crops, i.e. all but the most salt tolerant. The saline content of the used and reused water increases with each use and reuse, and field contact adds even more salts, so that the saline content problem cascades and concatenates as the river water flows to the sea, requiring ever greater flooding to minimize salt accumulation and its effects in the soils being irrigated.

BRIEF SUMMARY OF THE INVENTION

It is an object of the invention, therefore, to provide method and apparatus for the desalination of water. It is a further object to provide in situ desalinization of agricultural water right in the field. A further object is to distribute a plurality of small desalination units over the water flooding the field, each unit acting as a desalinator by taking up saline water and solar distilling it, returning desalinated water to the field, and collecting the salt content in a wick system that can be removed and reconditioned at a remote site so that its saline content is not returned to the rivers and canals used to carry water for irrigation. A preferred object is to provide a hand-carryable unit that can be floated on the agricultural water, and, using a reflector such as a primary mirror and secondary mirror that concentrates the incident solar radiation on the upper end of a wick that has its lower end immersed in the field water, effect in situ desalinization. Other objects will appear hereinafter.

The objects of the invention are realized in an in situ desalinating system comprising a multiplicity of distributively arranged individual desalinating units for continually removing saline content from field surface water, the units being floatable on the field surface water, each unit comprising a wicking structure including a wick having a lower end portion immersed in the field water and an upper end portion, a solar energy collection structure circumjacent the wick upper end portion including a primary mirror adapted to collect incident solar energy and redirect it to the upper end portion of the wick in wick-contained water evaporating relation, and an evaporated water collector arranged to condense evaporated water in saline content-free relation and return the condensed water to the field water.

In this and like embodiments, typically, the wicking structure comprises a bracket arranged to support the wick within the unit, the primary mirror being supported by the bracket, the water collector comprises a light-passing transparent or translucent dome opposing the primary mirror and adapted to pass incident solar radiation to the primary mirror, and there is further included a secondary reflector or mirror enclosed by the dome and arranged to redirect solar energy reflected upward by the primary mirror onto the wick upper end portion, the dome defines a condensed water flow paths from the dome to the field water, the wick is removable from the bracket and returnable thereto in saline content-cleansed relation, the solar collection structure includes a lens opposite the primary mirror, which lens reemits all angles of incident light from the lens primarily normal to the lens such that the solar collection structure lens is a source of lambertian light within the dome.

In a further embodiment, the invention provides an in situ desalinating system comprising a multiplicity of hand-carryable, distributively arranged individual desalinating units for continually removing saline content from field surface water, the units being floatable on the field surface water, each unit comprising a wicking structure including a wick having a lower end portion immersed in the field water and an upper end portion out of the field water, a solar energy collection structure circumjacent the wick upper end portion including a lens and primary mirror system adapted to collect incident solar energy and redirect it to the upper end portion of the wick in wick-contained water evaporating relation, and an evaporated water collector including a cover above the wick upper end portion arranged to condense evaporated water in saline content-free relation and return the condensed water to the field water circumjacently of the wick, the cover defining the solar collection lens.

In this and like embodiments, typically, the wicking structure comprises a bracket arranged to support the wick vertically disposed within the unit, the primary mirror comprises a spherical or parabolic reflector supported by the bracket, the water collector comprises a light-passing transparent or translucent dome defining the solar collection structure lens, the dome opposing the primary mirror and adapted to pass incident solar radiation thereto, and a secondary mirror arranged within the dome to redirect solar energy reflected upward by the primary mirror onto the wick upper end portion, the dome defines condensed water flow paths from the dome past the primary mirror and to the field water, the wick is demountable from the bracket and remountable thereto in saline content-cleansed relation, the dome-defined solar collection structure lens reemits all angles of incident light from the lens primarily normal to the lens, and the solar collection structure lens is a source of lambertian light within the dome.

In another embodiment, there is provided an in situ desalinating system comprising a desalinating unit for continually removing saline content from field surface-disposed saline water, the unit being floatable on field surface water and comprising a housing having a solar heat energy-passing, water-impervious wall defining a generally closed chamber having a lower portion adapted for contact with the saline field surface water and an upper portion generally out of contact with the field water, a saline water collection structure within the chamber supported by the housing for saline water immersion, reflector structure arranged to concentrate solar heat energy passed into the housing and to direct the concentrated energy to the collection structure for heating saline water collected in the collection structure to temperatures increasing the rate of water evaporation, the evaporated water being condensed within the chamber upper portion for return to the field surface water, the housing defining a condensed water return path to the field surface water, whereby saline water is returned to the field surface water with lowered saline content in field surface water saline content-ameliorating relation.

In this and like embodiments, typically, the chamber upper portion comprises a translucent material having a downwardly open shape arranged on the chamber lower portion to oppose the field surface water, the translucent material is a sandblasted, pattern-molded, or otherwise roughened surface to be light diffusing and is arranged to reemit all kinds of incident light primarily normal to the material shape, i.e. the translucent material functions as a source of lambertian light.

Further, in this embodiment, typically, the unit is hand-carryable and in water-free condition weigh less than about 10 pounds, the unit has a height of less than about 18 inches, and a width of less than about 18 inches, the water collection structure comprises a wick and a wick support mounted within the lower portion of the chamber, the wick comprises a fibrous member adapted to wicking water vertically from an immersed end upward, and the fibrous member is impervious to corrosion from salt.

In yet another embodiment, there is provided an in situ desalinating system comprising a multiplicity of hand-carryable, distributively arranged individual desalinating units for continually removing saline content from field surface water, the units being floatable on the field surface water, each unit comprising within a chamber a wicking structure including a wick support and a wick supported by the wick support in extended relation, the wick having a lower end portion immersed in the field water and an upper end portion out of the field water, a solar energy collection structure circumjacent the wick upper end portion including a lens and mirror system adapted to collect incident solar energy and redirect it to the upper end portion of the wick in wick-contained water evaporating relation, and an evaporated water collector including a cover above the wick upper end portion arranged to condense evaporated water in saline content-free relation and return the condensed water to the field water circumjacently of the wick.

Typically in this and like embodiments, the wick support comprises a bracket extended along the wick in supporting relation, the bracket exposing the wick within the chamber in concentrated solar heat energy-receiving relation, the chamber has a wall defining the lens, the lens comprises a lambertian light source, the chamber has a lower portion and the solar energy collection structure further includes a reflector structure comprising a primary mirror in the form of a mirrored web extending transversely across the chamber lower portion in spaced relation to the field surface water and a secondary mirror opposite the web for redirecting reflected solar radiation from the web onto the wick upper end, the web defining the wick support bracket.

In this and like embodiments, typically, the web has an upward facing mirrored surface that defines a parabolic or spherical primary mirror arranged to concentrate solar heat energy passing into the housing onto the mirror, the secondary mirror being opposite to and spaced above the wick upper end and arranged to reflect solar energy onto the wick, the bracket is disposed centrally of the chamber, the web extending radially thereof, whereby the wick is surrounded by the spherical or parabolic primary mirror, the primary and secondary mirrors being relatively arranged to concentrate solar heat energy onto exposed portions of the wick upper end in the bracket.

In a highly particular embodiment, there is provided an in situ desalinating system comprising a multiplicity of distributively arranged individual desalinating units for continually removing saline content from field surface disposed saline water, the units being hand-carryable and floatable on field surface water and comprising a housing having a solar heat energy-passing, water-impervious translucent plastic wall defining a generally closed chamber having a generally cylindrical lower portion adapted for contact with the saline field surface water and a parabolically shaped upper portion, a light energy collection and redirection structure comprising a primary mirror/reflector-defining web disposed transversely of the housing and an opposing secondary mirror above the primary mirror arranged to direct incident solar energy to a predetermined locus, the web having a central opening, a saline water collection structure comprising a fibrous wick having an upper end and a lower end and sized to be supported in the web opening, the web carrying the wick with its lower end arranged for immersion in saline field water and its upper end at the predetermined locus for heating saline water collected in the collection structure to temperatures at which the rate of water evaporation is increased, the evaporated water being condensed against the chamber upper portion for return along the wall to the field surface water, the housing lower portion and the web defining a condensed water return path to the field surface water, whereby saline water is returned to the field surface water with lowered saline content in field surface water saline content-ameliorating relation.

In this and like embodiments, again, typically, the wall defining the chamber upper portion is light-diffusing and provides lambertian light within the chamber upper portion.

The invention further provides a method of desalinating agricultural water in a field, including disposing a plurality of desalinating units upon the field water, maintaining in each unit a wicking structure including a wick lower end immersed in the water and an upper end in wicking communication with the wick lower end, providing a lens and mirror system including a primary mirror in each unit adapted to reflect solar radiation incident upon the unit onto the wick upper end, evaporating from the wick upper end solar distilled water, and returning the solardistilled water to the field water while retaining the saline content of the water in the wick. The method further contemplates separating the wick from the wicking structure, cleansing the wick of accumulated salts, and reusing the wick to collect saline content from the field water, floating the units upon the field water, and maintaining a translucent cover above the wick upper end, and condensing the evaporated water on the underside of the cover, the cover being shaped to return the condensed water to the field water away from the wick.

BRIEF DESCRIPTION OF THE SEVERAL VIEWS OF THE DRAWINGS

The invention will be further described in conjunction with the attached rawings in which.

DETAILED DESCRIPTION OF THE INVENTION

Figure 1:
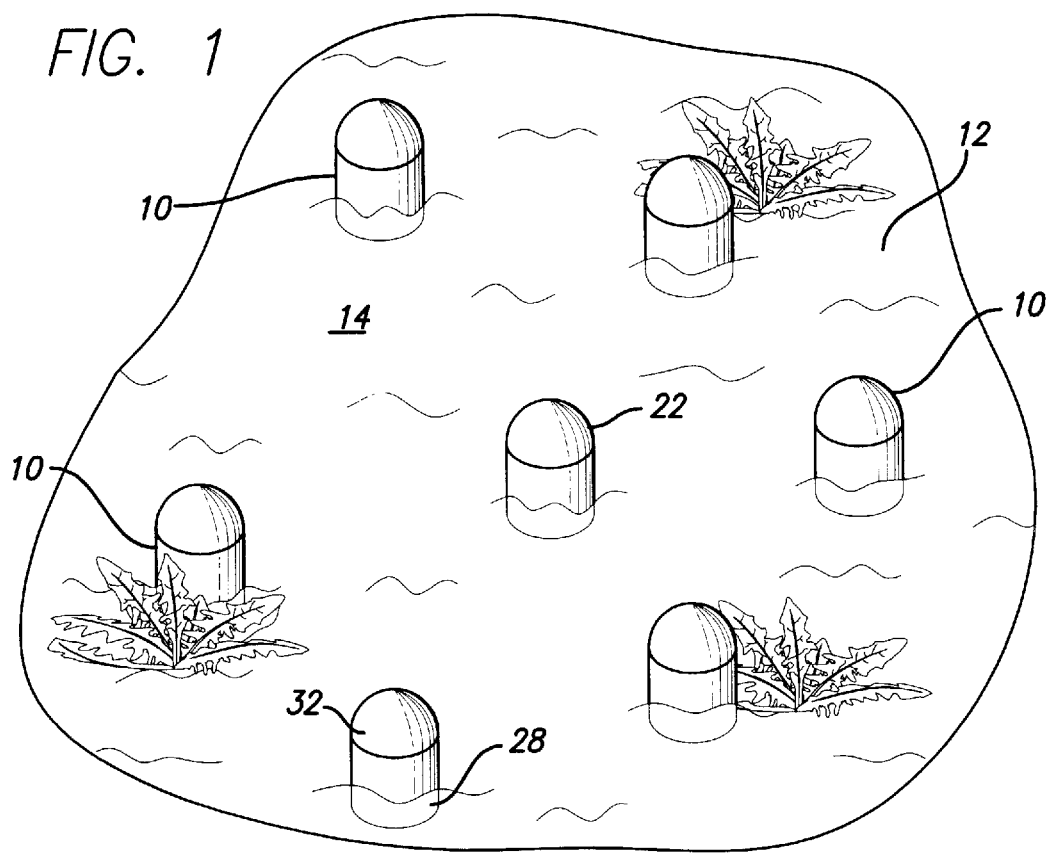
FIG. 1 is a schematic view of a cultivated field with a distributed multiplicity of desalinization devices according to the invention.

In accordance with the invention, water such as standing cultivated field water is desalinated by a series of independent units that float on the water surface, taking up the saline water with a wick, evaporating the water from the wick in desalinating relation by concentrating incident solar radiation with a combination of a reflector comprising a primary mirror and an opposing, secondary mirror onto the upper end of the wick while the wick lower end is immersed in the field water, capturing the desalinated vapor resulting by condensing within the unit and returning the condensed water to the field, and periodically renewing the wick by rinsing the salt from it at a cleaning station beyond the field. Water distributed in soil can also be desalinated by the invention, by placing the wick in contact with muddy or even moist soil.

With increased population and thus water use, the number of times water is used on crops and returned can only increase. With each reuse the quality becomes lower in terms of saline content. It has been reported that Colorado River water at the source contains 170 ppm (parts per million) salt, and that this rises to 2400 ppm at the Border of the United States and Mexico. Just 2000 ppm equals 16 pounds of salt per 1000 gallons of water.

Saline content herein refers to salts, namely compounds of metals or other positive ions (cations) with any negatively charged ions (anions). Of particular concern are salts that are inimical to plant growth. Ultimately, the saline content of the water becomes so high that the water cannot be returned for reuse and it is diverted to a collection pond, such as the Salton Sea or Tule Lake in California. Presently, the true economic costs of the detrimental environmental effects have not been visited directly upon the authors of these effects, in contrast to the case of industrial contaminants, but this will be changing without doubt, especially as farmers lose the political influence that has thusfar substantially protected them from the consequences of their environmentally adverse behaviors.

Salt accumulation per se, as occurs when nonflooding techniques are used on the fields, cannot be accepted since many cash crops will not grow in too saline soil. Expedients available to lessen salt accumulation other than flooding include distillation and reverse osmosis, both energy intensive, addition of gypsum or the like to the soil to promote vertical drainage to allow water to pass below the root zone so that salt accumulation does not affect plants for some indeterminate time.

The present invention uses solar energy in a novel, low cost manner, by doing the distillation and condensation in situ that is in the field. Pumps and storage costs, bête noirs of previous solar systems, are eliminated. Compare U.S. No. 4,135,985 to La Rocca, and U.S. No. 4,310,396 to Demaire, relating to solar desalinators that require transport of the water by pumps through piping to a central facility, and that may require chemicals and mechanical energy input as well as solar energy. Also, the relatively small volumes of water need for drinking and urban use is dwarfed by the volumes of water used in agriculture, making previously known solar systems even less practicable for the purposes of this invention. Small desalination systems that are directed primarily at making potable water need expensive silver ion exchange devices, see, e.g., U.S. No. 5,547,586 to Halperin, and cannot be contemplated for use in agriculture.

The present invention offers:

1. Low initial capital expense and low ongoing maintenance costs.
2. Use of a solar still of unique design for distilling and separating salt contamination from water.
3. Use of a mirror system with folded optics to concentrate light energy in a localized active area of the unit, the wick tip, for maximum efficiency in use of solar energy.
4. Unit floatation in the water being treated.
5. Rugged units that have no moving parts, that can be fabricated of common plastics, and that can be effectively deployed and recovered mechanically.

With reference now to the drawings in detail, in FIG. 1 the desalination units 10, typically sized to be hand-carryable (although mechanized servicing is to be preferred) in terms of weight and dimensions are shown deployed in an agricultural field 12 floating atop flooded irrigation water 14 which is usually slow-flowing and may be considered standing for purposes of this invention. The units 10 are designed to float bottom down as will be seen hereinafter.

Figure 5:
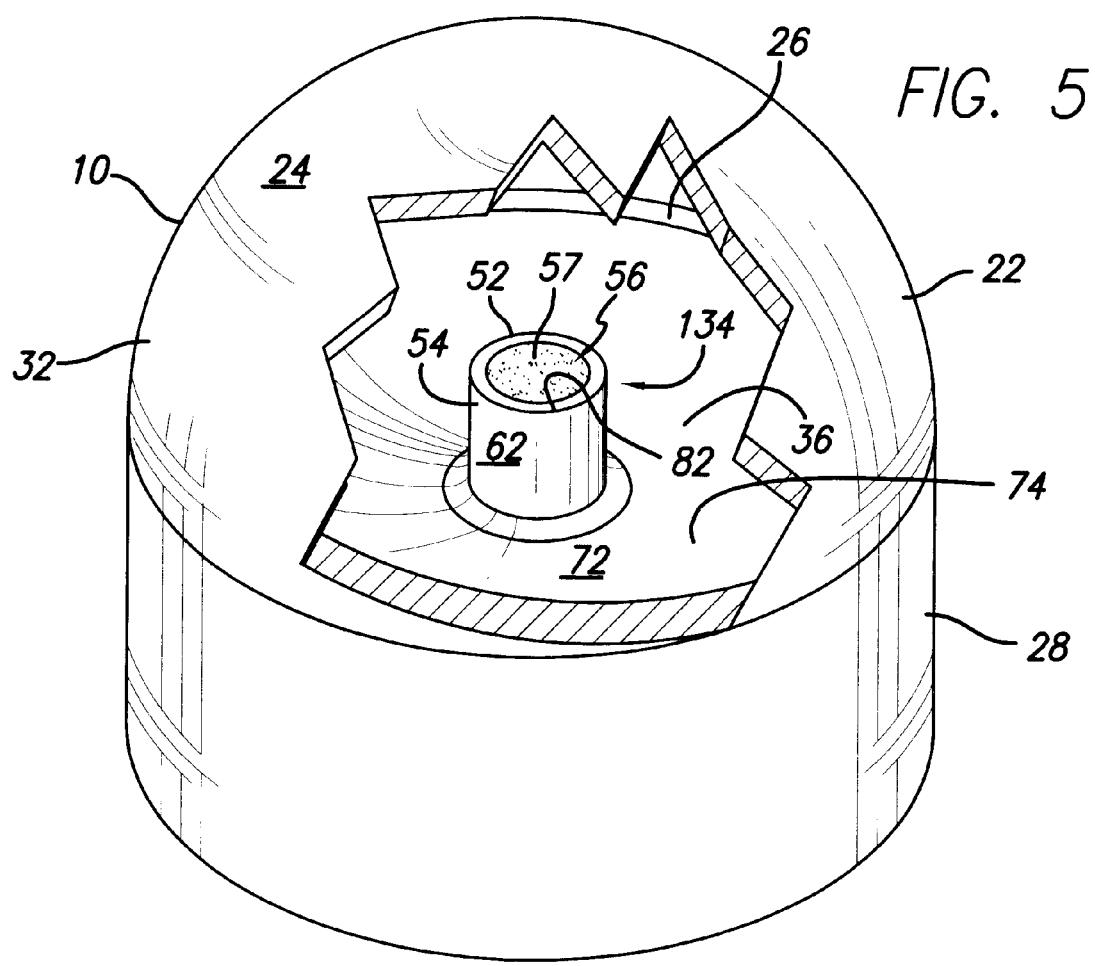
FIG. 5 is a view in vertical section of the invention desalinization device in a second embodiment.
Figure 6:
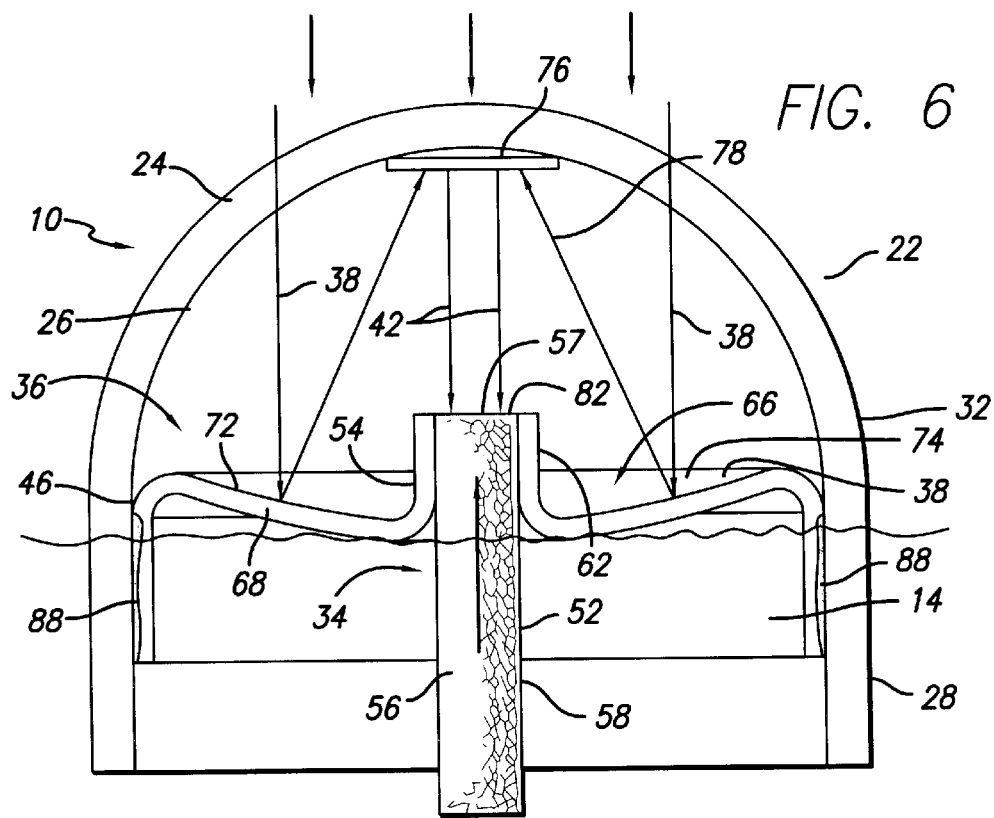
FIG. 6 is a view in vertical section of the desalinization device in a third embodiment, schematically depicting the radiation paths within the device.
Figure 7:
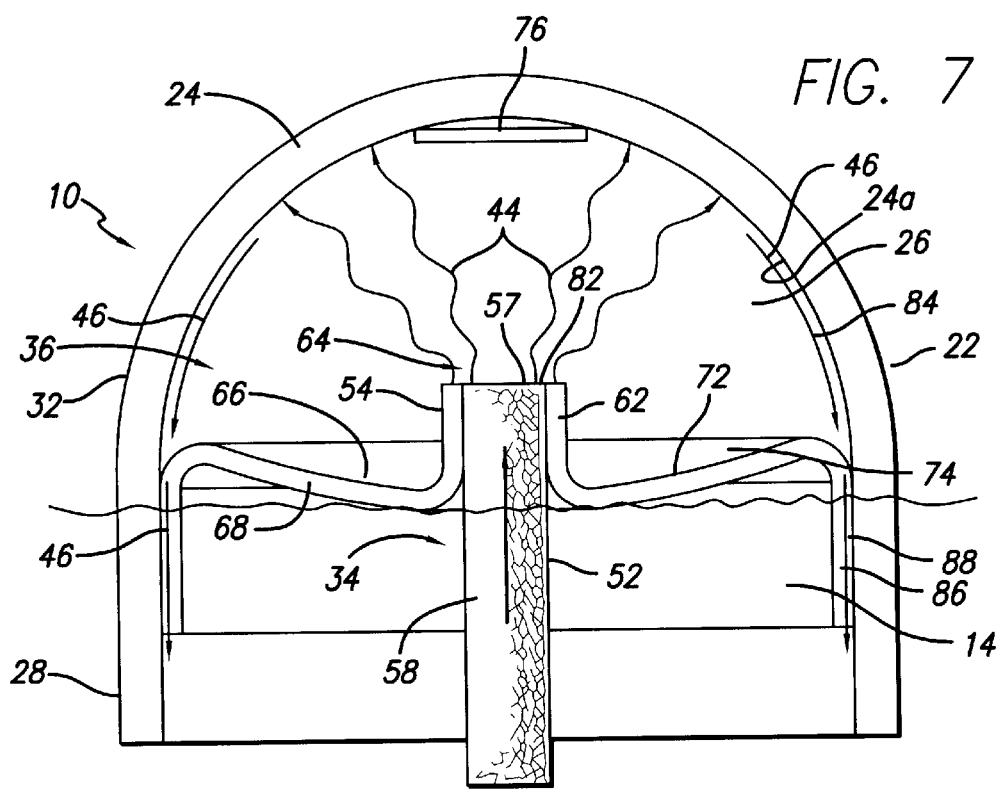
FIG. 7 is a view like FIG. 6, showing schematically the water evaporation and condensation paths within the third embodiment device.

With reference to FIGS. 5, 6 and 7, unit 10 defines an in situ desalinating system in which a multiplicity of such units are individually distributively arranged for continually removing saline content from field surface disposed saline water 14. Units 10 are floatable on the field surface water 14 as noted previously and typically comprise a housing 22. Housing 22 has a solar heat energy-passing lens comprising a water-impervious transparent or translucent wall 24 defining a generally closed chamber 26. Chamber 26 has a lower portion 28 adapted for contact with the saline field surface water 14 and an upper portion 32. There is a saline water collection structure 34 within the chamber 26 supported by the housing 22 for saline water 14 immersion. There is further, as more particularly shown in FIG. 6, a reflector structure 36 arranged to concentrate solar heat energy 38 passed into the housing 22 and to direct the concentrated energy rays 42 to the collection structure 34 for heating saline water collected in the collection structure to temperatures at which the water evaporates. As more particularly shown in FIG. 7, the evaporated water 44 (water vapor shown as wavy lines) is condensed within the chamber upper portion 32 for return to the field surface water 14. Housing 22 defines a condensed water return path 46, generally along the inside surface 24a of wall 24, to the field surface water, so that the saline water is returned to the field surface water with lowered saline content and the field surface water saline content is thereby ameliorated.

With further reference to FIGS. 5, 6 and 7, the chamber upper portion 32 comprises a transparent or preferably translucent suitable plastic material, such as acrylic or polycarbonate resin material, surface-treated to diffuse incident light into lambertian light as noted below, and has a downwardly open shape, as shown, arranged on and attached to the chamber lower portion 28 to oppose the field surface water 14.

Small in size, the units 10 in water-free condition will typically weigh less than about 10 pounds, have a height of less than about 18 inches, and a width of less than about 18 inches.

The water collection structure 34 comprises a wick 52 and a wick support 54 mounted within the lower portion 28 of the chamber 26. The wick 52 generally operates by capillary action and comprises a suitably adsorbent or absorbent fibrous member 56 suitably woven, folded, and/or pleated cellulosic natural or synthetic fibrous material having an upper end 57 and adapted to wicking water 14 vertically from the wick immersed end 58 upward to the upper end. Preferably, the fibrous member 56 is impervious to corrosion from salt, so as to be available for numerous reuses.

The water collection wick support structure 54 is supported by the housing 22, specifically in the embodiment shown by the lower portion 28 of the chamber 26, and in turn supports the wick 52 in extended relation. Wick support structure 54 comprises a bracket 62 extended along the wick 52 in supporting relation, the bracket exposing the wick within the chamber 26 in concentrated solar heat energy-receiving relation at a predetermined locus 64 that generally corresponds to the focal plane of the mirror system of the reflector structure 66.

The reflector structure 36 includes a reflector 66 that comprises in part a web 68 extending transversely across the chamber lower portion 32 in spaced relation to the field surface water 14. The web 68 has an upward facing surface 72 that defines a primary mirror 74 arranged to concentrate solar heat energy 38 passing into the housing 22 (FIG. 6). The reflector structure 36 further includes a secondary mirror 76 opposite the web 68 and arranged as shown to redirect reflected solar radiation 78 from the web as radiation rays 42 onto the wick upper end 57.

Web 68 preferably defines the wick support bracket 62, typically as an axially extended opening 82 formed centrally of the web 68. Mirror 76 is opposite to and spaced above the wick upper end 57. Bracket 62 is disposed centrally of the chamber 26. Web 68 extends radially of the bracket 62 so that the wick 52 is surrounded by the primary mirror 74, the primary mirror and the secondary mirror 76 being relatively arranged to concentrate solar heat energy 42 onto exposed portions of the wick upper end 57 held in the bracket 62.

Saline water 14 collected in the collection structure 34 is solar radiation-heated to elevated temperatures at which the rate that the water evaporates increases. The evaporated water is then condensed by surface contact with the wall interior 24a in the chamber upper portion 32 for return as a salt-free liquid 84 to the field surface water 14. Chamber lower portion 28 and the web 68 cooperate by spacing 88, cut-outs 206 (in FIG. 8) or other expedients to define a condensed water return path 46, 86, 287 to the field surface water 14. Saline water is returned to the field surface water 14, 214 with lowered or eliminated saline content.

Figure 2:
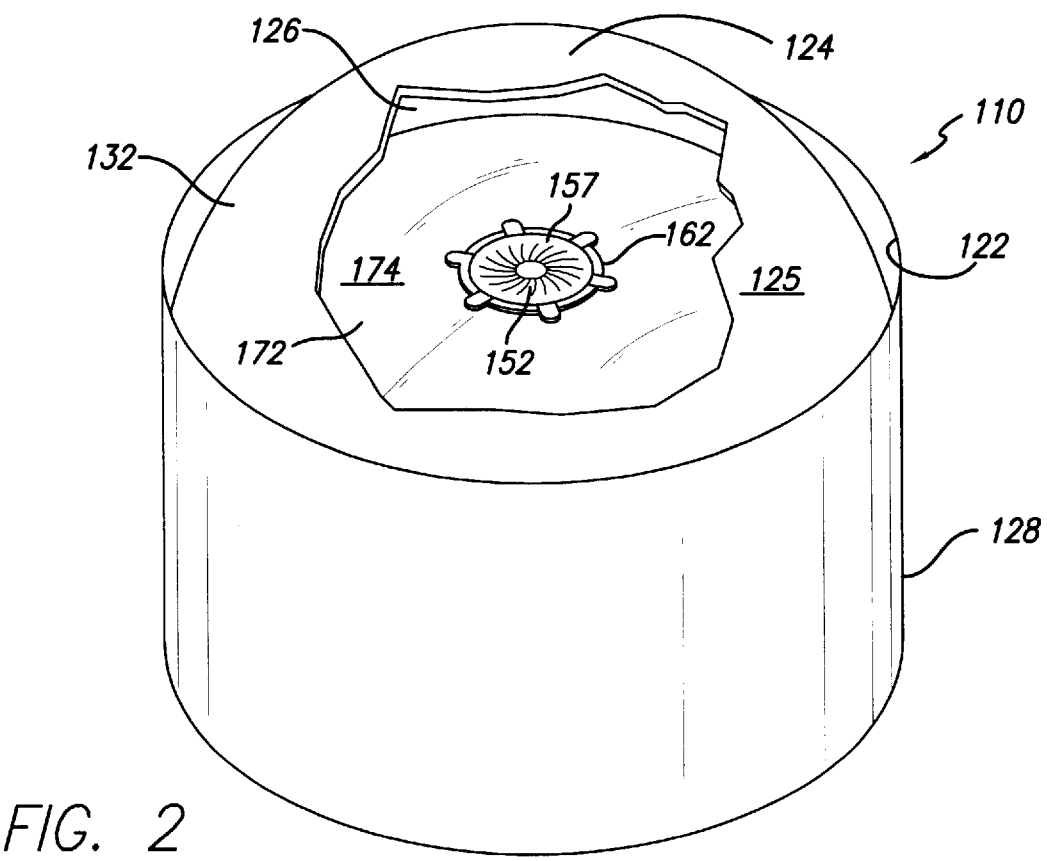
FIG. 2 is a perspective view the invention desalinization device in one embodiment, partly broken away to show underlying parts.
Figure 3:
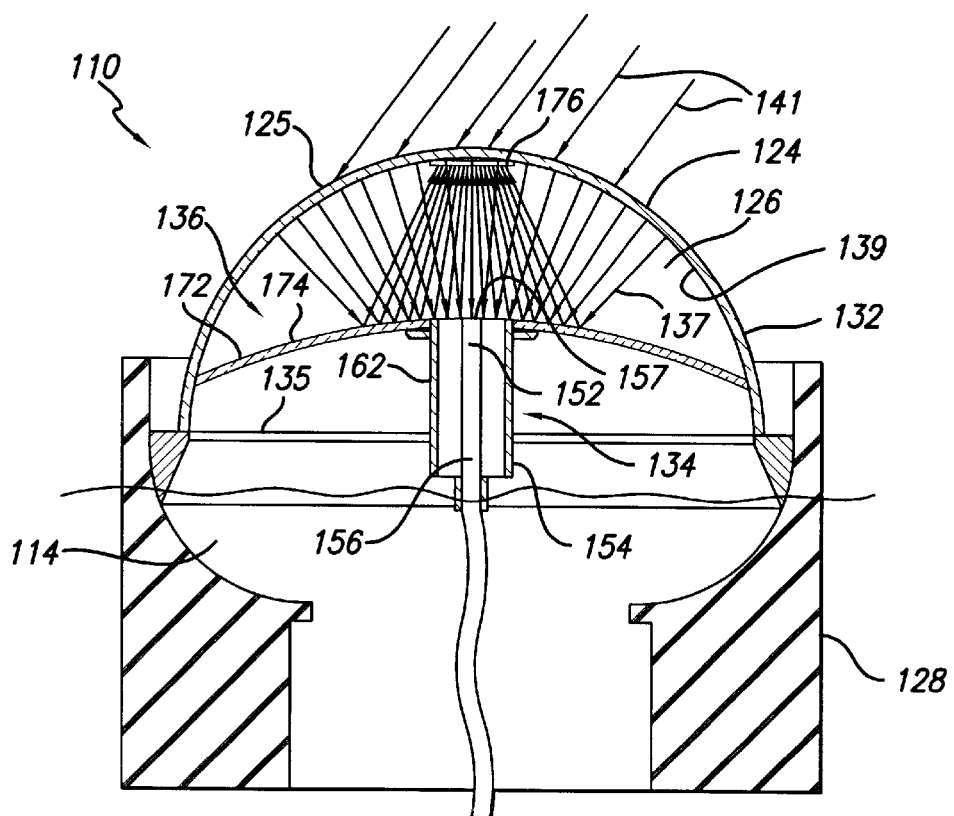
FIG. 3 is a view in vertical section of the desalinization device of FIG. 2, schematically depicting the radiation paths within the device.
Figure 4:
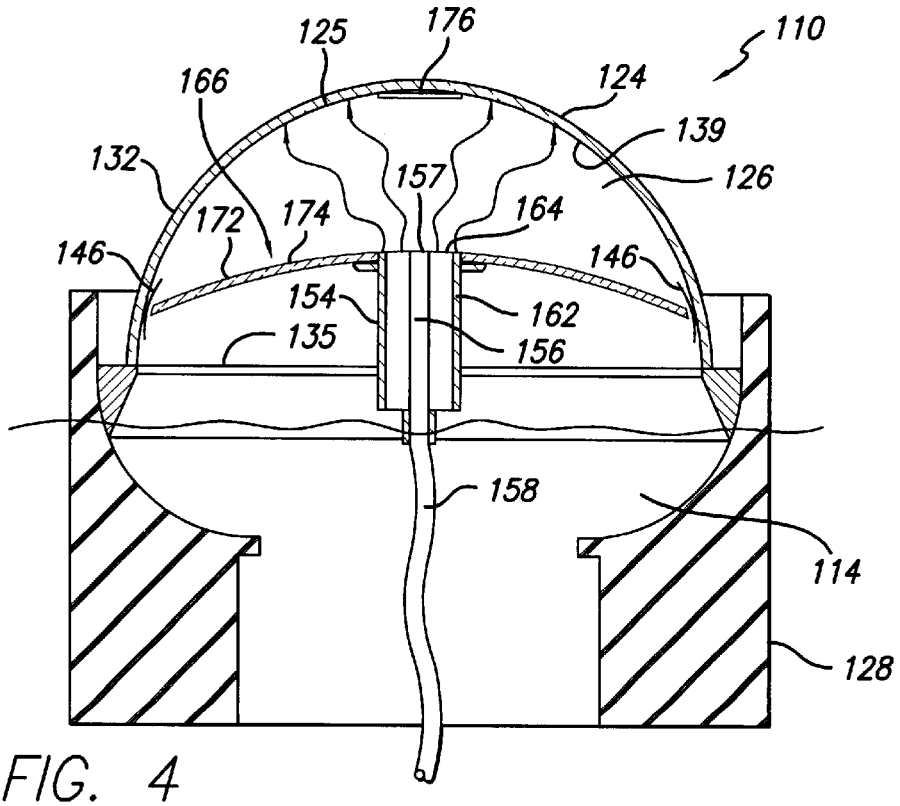
FIG. 4 is a view like FIG. 3, showing schematically the water evaporation and condensation paths within the device.

With reference now to the embodiment of FIGS. 2, 3 and 4, unit 110 defines a further in situ desalinating system in which one or a multiplicity of such units are individually distributively arranged for continually removing saline content from field surface disposed saline water 114. Units 110 are floatable on the field surface water 114 as noted previously and typically comprise a housing 122. Housing 122 has a solar heat energy-passing, water-impervious transparent or translucent lens 125 formed by wall 124. Wall 124 defines a generally closed chamber 126 having an annularly shouldered lower portion 128, somewhat oversized relative to the upper chamber 132, and adapted for contact with the saline field surface water 114. Housing lower portion 128 receives upper portion 132 and supports the saline water collection structure 134 with a shoulder supported support frame 135 that extends across the chamber lower portion 128. Reflector 166 is supported by the support frame 135 and in turn supports the wick 152 for saline water 114 immersion.

There is, further, in contradistinction to the FIGS. 5, 6 and 7 embodiment, in reflector structure 136 a convex, preferably spherical, rather than concave primary mirror 174 arranged to concentrate lambertian light 137 coming through the lens 125 defined by wall 124. Lambertian light is characterized by emitting primarily normal (90°) to the surface 139 of the lens 125 regardless of the angle of impingement of the incident light 141 on the lens. Lens 125 is surface-roughened as by being sandblasted or has external or internal diffractors that produce lambertian light within the chamber 126. As shown in FIG. 3, the incident light 141 comes at varying angles and is principally emitted as light rays 137 after passing through the lens 125 normal to the lens inside surface 139. The emitted light 137 then impinges on the primary mirror 174 and by means of its spherical, convex shape the light is reflected to the secondary mirror 176 whence it is directed onto the top 157 of the wick 152 to better evaporate the water wicked there from the field water 114, leaving the salt behind. Water evaporation and recovery of the desalinated condensate along paths 146 are as previously described.

Thus, solar heat energy 141 is passed into the housing 122 and its concentrated energy 142 focused on the water collection structure 134 for heating saline water collected in the collection structure to temperatures at which the water evaporates. As shown in FIG. 4, the evaporated water 144 (water vapor shown as wavy lines) is condensed within the chamber upper portion 132 for return to the field surface water 114, housing 122 defining the condensed water return path 146 to the field surface water 114, so that the saline water is returned to the field surface water with lowered saline content and the field surface water saline content is thereby ameliorated.

With further reference to FIGS. 3 and 4, the chamber upper portion 132 comprises a preferably translucent suitable plastic material, such as acrylic or polycarbonate resin material, surface treated to diffuse light for lambertian light as noted above, and has a downwardly open shape, as shown, arranged on and attached to the chamber lower portion 128 to oppose the field surface water 114. As described in the previous embodiment, the units 110 are small in size.

The water collection structure 134, like structure 34, comprises wick 152 and a wick support 154 mounted within the lower portion 128 of the chamber 126. The wick 152, as before, generally operates by capillary action and comprises suitably adsorbent or absorbent fibrous member 156 having upper end 157 and adapted to wicking water 114 vertically from the wick immersed end 158 upward to the upper end. Preferably, the fibrous member 156 is impervious to corrosion from salt, so as to be available for numerous reuses.

The water collection wick support structure 154 is supported by frame 135 supported in turn by the housing 122, specifically in the embodiment shown by the lower portion 128 of the chamber 126, and in turn supports the wick 152 in extended relation. Wick support structure 154 comprises bracket 162 extended along the wick 152 in supporting relation. Bracket 162 exposes the wick 152 within the chamber 126 in concentrated solar heat energy-receiving relation at a predetermined locus 164 that generally corresponds to the focal plane of the mirror system of the reflector 166.

The reflector 166 thus comprises in part the support frame 135 extending transversely across the chamber lower portion 128 in spaced relation to the field surface water 114. The support frame 135 supports primary mirror 174. Primary mirror 174 has an upward facing spherical surface 172 arranged to reflect solar heat energy 141 passing into the housing 122 onto mirror 176. The reflector structure 166 thus further includes the mirror 176 opposite the primary mirror 174 and arranged as shown to direct the reflected solar radiation 178 from the reflector and mirror onto the wick upper end 157.

Primary mirror 174 preferably supports the wick support bracket 162, typically at opening 182 formed centrally in the mirror. Mirror 176 is opposite to and spaced above the wick upper end 157. Bracket 162 is disposed centrally of the chamber 126. Primary mirror 174 extends radially of the bracket 162, the primary mirror and mirror 176 being relatively arranged to concentrate solar heat energy onto exposed portions of the wick upper end 157 in the bracket 162.

Collected saline water 114 after evaporation as previously described is returned as a salt-free liquid 184 to the field surface water 114.

Figure 8:
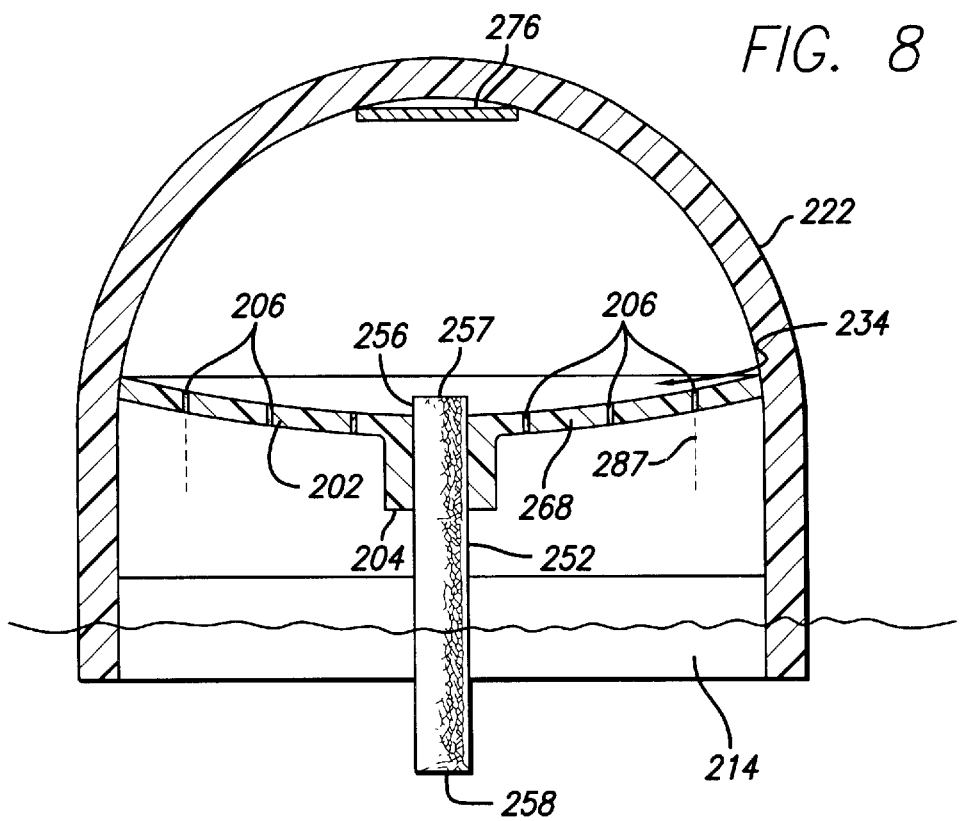
FIG. 8 is a view in section of the desalination device of FIG. 5.

FIG. 8 shows an alternative embodiment in which like parts to the first embodiment are given like numbers plus 200. Thus, wick 252 is supported by a primary mirror 202 that has a single curvature as shown and a downwardly extending bracket 204 to support the wick. The primary mirror 202 has a series of holes 206 therein for allowing any water 284 droplets or streamlets landing by chance on the primary mirror to drip back to the water 214.

Figure 9:
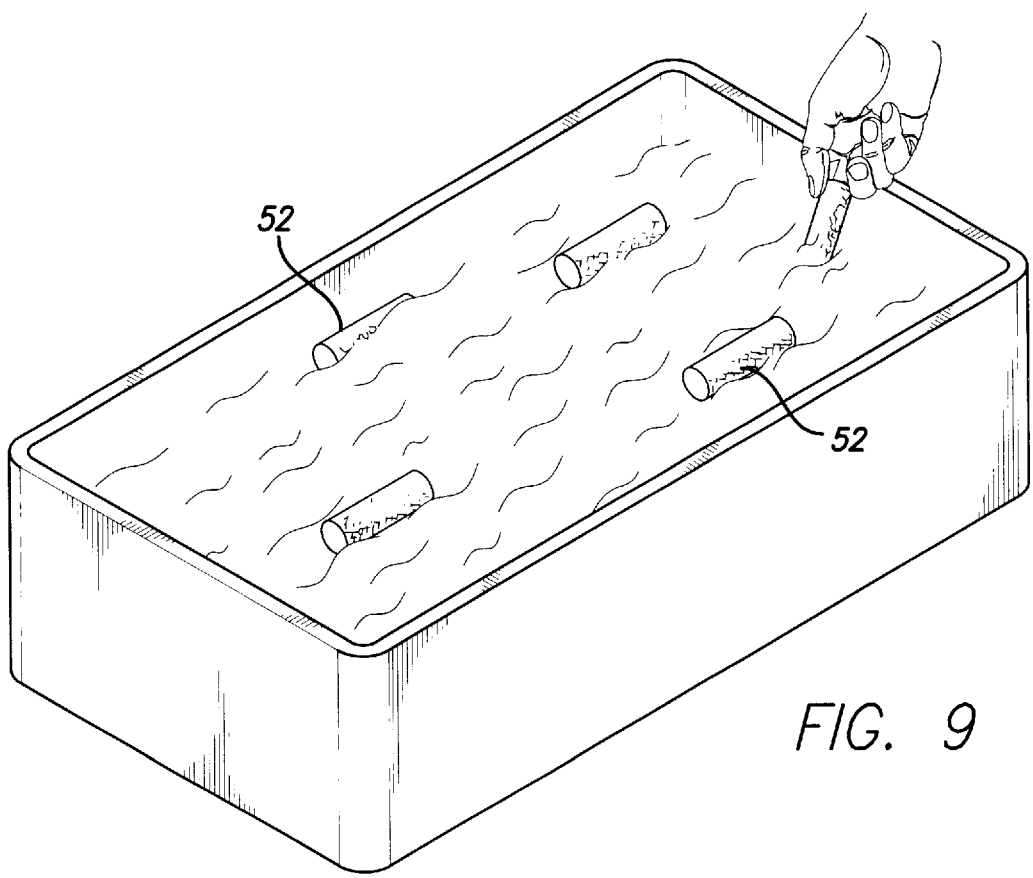
FIG. 9 is a pictorial view of apparatus for the regeneration of the desalinization device wicks.

With reference to FIG. 9, the wicks 52 are eventually withdrawn from the units 10, suitably after the units are harvested from the field, and then washed in water to clean their salt content, the wash water being evaporated in ponds or put into the ground rather than returned to the irrigation water source of river or canal. The salt is collected for use or stored. Salt build up in the river or canal from the agricultural water is prevented. The wicks 52 are returned to the units 10 for redeployment in water 14 on an agricultural field.

The invention method of desalinating agricultural water 14 standing in a cultivated field includes disposing a plurality of desalinating units 10 upon the standing water, maintaining in each unit a water collection structure 34 including a wick 52 having lower end portion 58 immersed in the standing water and an upper end portion tip 57 in wicking communication with the wick lower end, providing a mirror 74 in each unit adapted to reflect solar radiation incident upon the unit onto the wick upper end, evaporating from the wick upper end solar distilled water 84, and returning the solar-distilled water to the standing water 14 while retaining the saline content of the water in the wick tip 57. Ultimately, the units 10 are collected, a golf ball collection-type machine might suffice, the wick 52 is separated from the water collection structure 34, cleansed of accumulated salts by solution or mechanical means, cf. FIG. 9, following which the wick is replaced or reused to collect saline content from standing water.

In fabricating the invention unit 10, the reflector 66 comprising primary mirror 74 is snapped into the housing chamber lower portion 32. A cotton wick 52 is inserted in the opening in the primary mirror 74 so that the wick lower end 58 extends from the bottom of the housing 22. A mirror 76 is mounted inside the domed chamber upper portion 32, which is suitably Lexan®. The secondary mirror 76 is suitably in the form of a circular stainless steel panel and is located opposite the parabolic or spherical mirror 74 at the midpoint of the chamber upper portion 32. Primary mirror 74 and secondary mirror 76 are designed so that the focal plane of the mirror system coincides with the top 57 of the wick 52 using Newtonian folded optics principles. The sunlight is thus concentrated onto the wick upper end 57, increasing the energy there similarly to the effect of a magnifying glass.

The increase in solar energy expressed as solar concentration realized at the wick end can be calculated as follows where Concentration Factor (C) is approximately:

$$C = (\text{Area of mirror} - \text{Area of Wick})/(\text{Area of Wick})$$

Assuming a 2 inch diameter mirror, $$\text{Area of Mirror} = \pi \times d^2/4 = 3.34 \times 4/4 = 3.14 \text{ in}^2$$

Assuming a wick diameter of 0.375 in.

$$\text{Area of Wick} = \pi \times d^2/4 = 3.14 \times 0.375 \times 0.375/4 = 0.11 \text{ in}^2$$

and thus, $$C = (3.14 - 0.11)/(0.11)$$

$$C = 27.5$$

The solar energy impinging on the wick end is thus about 27 times as intense as the solar energy impinging on the housing generally, if losses are neglected. In a real world device, the losses in reflection and scattering of light would reduce the theoretical value by about 20%, leaving a still very great multiple in solar intensity increase of 20 times.

The just described system has application in other than commercial agriculture. For example, trees and shrubs kept in large planters are prone to also accumulate salts from being watered over time, and the invention system could be used to ameliorate this salt build-up problem as well.

The invention thus provides method and apparatus for the desalination of water, such as agriculturally applied water right in the field by the distribution of numerous small desalination units over the water flooding the field, having each unit act as a desalinator by taking up saline water and solar distilling it, returning desalinated water to the field, and collecting the salt content in a wick system that can be removed and reconditioned at a remote site so that its saline content is not returned to the rivers and canals used for irrigation. The invention unit is typically hand-carryable able to be floated on the agricultural water, and, using a reflector and mirror that concentrates the incident solar radiation on the upper end of a wick that has its lower end immersed in the field water, capable of effecting in situ desalinization.

The foregoing objects are thus met.

I claim:

1. An in situ desalinating system comprising a multiplicity of distributively arranged individual desalinating units for continually removing saline content from field surface water while returning the desalinated water to the field water, said units being floatable on said field surface water, each said unit comprising a wicking structure including a wick having a lower end portion immersed in and in open communication with said field water and an upper end portion, a solar energy collection structure adjacent said wick upper end portion including a primary mirror adapted to collect incident solar energy and redirect it to the upper end portion of said wick In wick-contained water evaporating relation to produce evaporated water within said structure, and an evaporated water collector arranged to condense said evaporated water in saline content-free relation and return said condensed water to said field water.

2. The desalinating system according to claim 1, in which said wicking structure comprises a bracket arranged to support said wick within said unit, said primary mirror being supported by said bracket.

3. The desalinating system according to claim 2, in which said water collector comprises a light-passing dome opposing said primary mirror and adapted to pass incident solar radiation to said primary mirror, and Including also a secondary mirror enclosed by said dome and arranged to redirect solar energy reflected upward by said primary mirror onto said wick upper end portion.

4. The desalinating system according to claim 3, in which said dome defines a condensed water flow paths from said dome to said field water.

5. The desalinating system according to claim 4, in which said wick is removable from said bracket and returnable thereto in saline content-cleansed relation.

6. The desalinating system according to claim 1, in which said solar collection structure includes a lens opposite said primary mirror that reemits all angles of incident light from said lens primarily normal to said lens.

7. The desalinating system according to claim 6, in which said solar collection structure lens is a source of lambertian light within said dome.

8. An in situ desalinating system comprising a multiplicity of hand-carryable, distributively arranged individual desalinating units for continually removing saline content from field surface water, said units being floatable on said field surface water, each said unit comprising a wicking structure including a wick having a lower end portion immersed in said field water and an upper end portion out of said field water, a solar energy collection structure circumjacent said wick upper end portion including a lens and primary mirror system adapted to collect incident solar energy and redirect it to the upper end portion of said wick in wick-contained water evaporating relation, and an evaporated water collector including a cover above said wick upper end portion arranged to condense evaporated water in saline content-free relation and return said condensed water to said field water beyond said wick, said cover defining said solar collection lens.

9. The desalinating system according to claim 8, in which said wicking structure comprises a bracket arranged to support said wick vertically disposed within said unit, said primary mirror being supported by said bracket.

10. The desalinating system according to claim 9, in which said water collector comprises a light-passing dome, said dome defining said solar collection structure lens, said lens opposing said primary mirror and being adapted to pass incident solar radiation to said primary mirror, and a secondary mirror arranged within said dome lens to redirect solar energy reflected upward by said primary mirror onto said wick upper end portion.

11. The desalinating system according to claim 10, in which said dome defines condensed water flow paths from said dome past said primary mirror and to said field water.

12. The desalinating system according to claim 11, in which said wick is demountable from said bracket and remountable thereto in saline content-cleansed relation.

13. The desalinating system according to claim 12, in which said dome-defined solar collection structure lens is a source of lambertian light within said dome.

14. An in situ desalinating system comprising a multiplicity of hand-carryable, distributively arranged individual desalinating units for continually removing saline content from field surface water, said units being floatable on said field surface water, each said unit comprising a wicking structure including a wick having a lower end portion immersed in said field water and an upper end portion out of said field water, said wicking structure further comprising a bracket arranged to support said wick vertically disposed within said unit, said wick being demountable from said bracket and remountable thereto in saline content-cleansed relation, solar energy collection structure circumjacent said wick upper end portion including a lens and primary mirror system adapted to collect incident solar energy and redirect it to the upper end portion of said wick in wick-contained water evaporating relation, said primary mirror being supported by said bracket, and an evaporated water collector comprising a light-passing dome above said wick upper end portion arranged to condense evaporated water in saline content-free relation and return said condensed water to said field water beyond said wick, said dome defining said solar collection structure lens opposite said primary mirror and adapted to pass indent solar radiation to said primary mirror, said lens reemitting all angles of incident light from said lens primarily normal to said lens, a secondary mirror arranged within said dome to redirect solar energy reflected by said primary mirror onto said wick upper end portion said dome defining condensed water flow paths from said dome past said primary mirror and to said field water, said dome-defined solar collection structure lens reemitting all angles of incident light from said lens primarily normal to said lens.

15. An in situ desalinating system comprising a desalinating unit for continually removing saline content from field surface-disposed saline water, said unit being floatable on field surface water and comprising a housing having a solar heat energy-passing, water-impervious wall defining a generally closed chamber having a lower portion adapted for contact with said saline field surface water and an upper portion generally out of contact with said field water, a saline water collection structure within said chamber supported by said housing for saline water immersion, reflector structure arranged to concentrate solar heat energy passed Into said housing and to direct said concentrated energy to said water collection structure for heating saline water collected in said collection structure to temperatures increasing the rate of water evaporation, said evaporated water being condensed within said chamber upper portion for return to said field surface water, said housing defining a condensed water return path to said field surface water, whereby saline water is returned to said field surface water with lowered saline content in field surface water saline content-ameliorating relation.

16. The desalinating system according to claim 15, in which said chamber upper portion comprises a translucent material having a downwardly open shape arranged on said chamber lower portion to oppose said field surface water.

17. The desalinating system according to claim 16, in which said translucent material is light diffusing and arranged to reemit all kinds of incident light primarily normal to said material.

18. The desalinating system according to claim 17, in which said translucent material is a source of lambertian light.

19. The desalinating system according to claim 15, in which said unit is hand-carryable and in water-free condition weighs less than about 10 pounds.

20. The desalinating system according to claim 15, in which said unit has a height of less than about 18 inches, and a width of less than about 18 inches.

21. The desalinating system according to claim 15, in which said water collection structure comprises a wick and a wick support mounted within the lower portion of said chamber.

22. The desalinating system according to claim 15, In which said wick comprises a fibrous member adapted to wicking water vertically from an immersed end upward.

23. The desalinating system according to claim 22, in which said fibrous member is impervious to corrosion from salt.

24. An in situ desalinating system comprising a multiplicity of hand-carryable, distributively arranged individual desalinating units for continually removing saline content from field surface water, said units being floatable on said field surface water, each said unit comprising within a chamber a wicking structure including a wick support and a wick supported by said wick support in extended relation, said wick having a lower end portion immersed in said field water and an upper end portion out of said field water, a solar energy collection structure circumjacent said wick upper end portion including lens and mirror system arranged to collect incident solar energy and redirect it to the upper end portion of said wick in wick-contained water evaporating relation, and an evaporated water collector including a cover above said wick upper end portion arranged to condense evaporated water in saline content-free relation and return said condensed water to said field water circumjacently of said wick.

25. The desalinating system according to claim 24, in which said wick support comprises a bracket extended along said wick in supporting relation, said bracket exposing said wick within said chamber in concentrated solar heat energy-receiving relation.

26. The desalinating system according to claim 25, in which said chamber has a wall defining said lens.

27. The desalinating system according to claim 26 in which said lens comprises a lambertian light source.

28. The desalinating system according to claim 24, in which said chamber has a lower portion and said solar energy collection structure further includes a reflector primary mirror comprising a mirrored web extending transversely across said chamber lower portion in spaced relation to said field surface water and a secondary mirror opposite said web for redirecting reflected solar radiation from said web onto said wick upper end, said web defining said wick support bracket.

29. The desalinating system according to claim 28, in which said bracket is disposed centrally of said chamber, said web extending radially thereof, whereby said wick is surrounded by said primary mirror, said primary mirror and secondary mirror being relatively arranged to concentrate solar heat energy onto exposed portions of said wick upper end in said bracket.

30. An in situ desalinating system comprising a multiplicity of hand-carryable, distributively arranged individual desalinating units for continually removing saline content from field surface water, said units being floatable on said field surface water, each said unit comprising within a chamber a wicking structure including a wick support and a wick supported by said wick support in extended relation, said wick having a lower end portion immersed in said field water and an upper end portion out of said field water, a solar energy collection structure circumjacent said wick upper end portion including lens and mirror system arranged to collect Incident solar energy and redirect it to the upper end portion of said wick in wick-contained water evaporating relation, and an evaporated water collector including a cover above said wick upper end portion arranged to condense evaporated water in saline content-free relation and return said condensed water to said field water circumjacently of said wick, said chamber having a lower portion, said solar energy collection structure further including a reflector primary mirror comprising a mirrored web extending transversely across said chamber lower portion in spaced relation to said field surface water and a secondary mirror opposite said web for redirecting reflected solar radiation from said web onto said wick upper end, said web defining said wick support bracket, said web having an upward facing surface that defines said primary mirror, said primary mirror being arranged to concentrate solar heat energy passing into said housing onto said primary mirror, said secondary mirror being opposite to and spaced above said wick upper end.

31. An in situ desalinating system comprising a multiplicity of distributively arranged individual desalinating units for continually removing saline content from field surface disposed saline water, said units being hand-carryable and floatable on field surface water and comprising a housing having a solar heat energy-passing, water-impervious translucent plastic wall defining a generally closed chamber having a generally cylindrical lower portion adapted for contact with said saline field surface water and a parabolically shaped upper portion, a light energy collection and redirection structure comprising a primary mirror-defining web disposed transversely of said housing and an opposing secondary mirror above said primary mirror arranged to direct incident solar energy to a predetermined locus, said web having a central opening, a saline water collection structure comprising a fibrous wick having an upper end and a lower end and sized to be supported in said web opening, said web carrying said wick with its lower end arranged for immersion in saline field water and its upper end at said predetermined locus for heating saline water collected in said collection structure to temperatures at which evaporation of said water is increased, said evaporated water being condensed against said chamber upper portion for return along said wall to said field surface water, said housing lower portion and said web defining a condensed water return path to said field surface water, whereby saline water is returned to said field surface water with lowered saline content in field surface water saline content-ameliorating relation.

32. The in situ desalinating system according to claim 31 In which said wall defining said chamber upper portion is light-diffusing and provides lambertian light within said chamber upper portion.

* * * * *